3,466,236
IRRADIATION OF AMINOCYCLOBUTANONES
Hans U. Hostettler, Zurich, Switzerland, assignor to Eastman Kodak Company, Rochester, N.Y., a corporation of New Jersey
No Drawing. Filed Sept. 1, 1966, Ser. No. 576,532
Claims priority, application Great Britain, Nov. 9, 1965, 47,580/65
Int. Cl. B01j 1/10; C07c 3/24
U.S. Cl. 204—158                     10 Claims

ABSTRACT OF THE DISCLOSURE

Cyclopropylamine and tetrahydrofuranamine compounds are formed by ultraviolet irradiation of certain 3-aminocyclobutanones in the presence of compounds having a labile hydrogen atom. The cyclopropylamine compounds are formed by the decarbonylation of the starting material. The tetrahydrofuranamine compounds are formed by the addition of the labile hydrogen-containing compound to the starting material. The cyclopropylamine and tetrahydrofuranamine compounds are useful for pharmaceutical purposes.

---

This invention relates to the irradiation of certain 3-aminocyclobutanones.

I have discovered that the subjection to ultraviolet radiation of compounds of the following general formula:

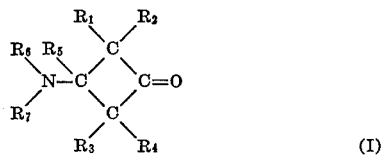

(I)

where $R_1$, $R_2$ $R_3$, $R_4$ may be the same or different and represent alkyl groups, or phenyl, or $R_1$ and $R_2$ or $R_3$ and $R_4$ may represent part of a carbocyclic or heterocyclic 5 or 6-membered ring, and $R_5$, $R_6$ and $R_7$ may be the same or different such as hydrogen or alkyl, unsaturated alkyl, alicyclic, aromatic, or heterocyclic groups or a group containing nitrogen, oxygen or sulphur, in the presence of a compound of the formula R—H having a labile hydrogen atom, e.g., water, alcohols, phenols or primary or secondary amines, surprisingly yields a mixture of compounds one of which has the general formula:

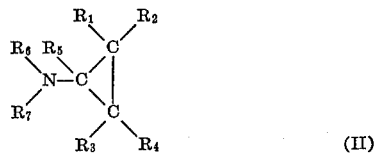

(II)

and the other has the following general formula:

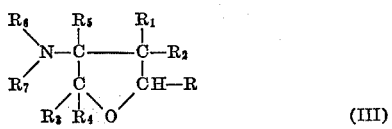

(III)

where in Formulae II and III, $R_1$, $R_2$, $R_3$, $R_4$, $R_5$, $R_6$ and $R_7$ have the meanings given above and where R is the residue of the compound having a labile hydrogen atom after the removal of said labile hydrogen atom, e.g., hydroxyl, alkoxy, aryloxy, alkylamino or dialkylamino, depending upon whether the treatment is performed in the presence respectively, of water, alcohols, phenols, primary amines or secondary amines.

The compounds of Formula II are useful for pharmaceutical purposes such as, tranquilizers, sedatives, anorectics, central nervous system stimulants, monoamine oxidase inhibitors, ataractics, antidepressant agents or hypotensive agents and as chemical intermediates in the preparation of such compounds as shown in Kaiser et al., U.S. Patent 3,059,020, and Weinstock, U.S. Patent 3,079,403.

The compounds of Formula III may be used as intermediates for the preparation of compounds which have neurophysiological properties as shown in Eugster et al., U.S. Patent 2,895,965.

The ultraviolet irradiation of the compounds of Formula I is best performed by using ultraviolet light of wavelengths from 250 to 370 m$\mu$, produced, for instance by means of mercury vapour lamps. This may be done by exposing to ultraviolet the compounds of Formula I together with an equimolar amount, or an excess, of water, alcohols, phenols or primary or secondary amines. The use of an inert organic solvent to form a solution of the aminocyclobutanone may often be advantageous, for instance when using small quantities of the aminocyclobutanone; its presence often prevents undesirable side reactions. When making the final compounds where R is alkoxy the amount of alcohol employed may be large because it can also function as solvent.

The irradiation may also be carried out with the hydrochlorides of the compounds of Formula I dissolved in chloroform or in water or with the compounds of Formula I dissolved in dilute aqueous acids.

The total yield of both products, relative to the amount of compound of Formula I which is consumed, is about 80% by moles, and the two products are usually formed in the ratio of between 30 to 50 by moles and 50 to 30 by moles.

The compounds of Formulae II or III can be separated and isolated without difficulty. The compounds of Formula II can usually be first removed from the reaction mixture by distillation under reduced pressure and then the undistilled residue can be recrystallized to separate the compound of Formula III.

In the formulae of the aforesaid compounds, examples of groups represented by $R_1$, $R_2$, $R_3$ and $R_4$ are methyl, ethyl, propyl, butyl, isobutyl, phenyl, benzyl, tolyl or the groupings:

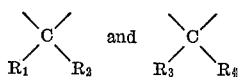

may be cyclopentylidene or cyclohexylidene or their alkyl-substituted homologs, such as 3-methylcyclopentylidene and 4-methylcyclohexylidene.

Examples of groups represented by $R_5$, $R_6$ and $R_7$ are hydrogen, methyl, ethyl, propyl, isopropyl, butyl, hexyl, octyl, dodecyl, t-butyl, t-octyl, allyl, isobutenyl, cyclopropyl, cyclobutyl, cyclopentyl, cyclohexyl, phenyl, tolyl, xylyl, naphthyl, benzyl, indolylmethyl, benzoyl, acetyl, formyl, methoxycarbonyl, ethoxycarbonyl, carbamoyl, tosylcarbamoyl, aminosulphonyl, cyano and substituted derivatives thereof. Examples of substituted groups represented by $R_5$, $R_6$ or $R_7$ groups are 3-hydroxypropyl, 2-aminoethyl, 2 - dimethylaminoethyl, 2,4,6 - trimethoxyphenyl, 4 - diethylaminophenyl, 4 - chlorophenyl and 4-trifluorophenyl. The grouping

may also be pyrrolidino, morpholino, piperidino or piperazino.

Examples of groups represented by R are methoxy, ethoxy, isopropoxy, n-propoxy, allyloxy, n-butoxy, isobutoxy, t-butoxy, phenoxy, benzyloxy, methlamino, ethylamino, t-butylamino, dimethylamino, diethylamino, methylbenzylamino and anilino.

$R_1$, $R_2$, $R_3$ and $R_4$ of the compounds of the preceding formulae, when taken singly, are preferably alkyl of 1 to about 8 carbons or phenyl. $R_1$ and $R_2$, when taken collectively with the carbon atom to which they are attached, and $R_3$ and $R_4$, when taken collectively with the carbon atom to which they are attached, preferably represent joined alkylene groups completing a saturated carbocyclic ring of 5 or 6 carbon atoms.

The substituent $R_5$ is preferably hydrogen, alkyl of 1 to about 8 carbons, or phenyl.

Each of $R_6$ and $R_7$, when taken singly, are preferably hydrogen, alkyl of 1 to about 8 carbons, allyl, benzyl, or phenyl. $R_6$ and $R_7$, when taken collectively with the nitrogen atom to which they are attached, represent joined radicals completing a heterocyclic ring of 5 to 6 ring atoms.

The substituent R, as noted hereinbefore, is the residue of a compound having a labile hydrogen atom after the removal of said labile hydrogen atom. R is preferably hydroxy, alkoxy of 1 to about 8 carbon atoms, phenoxy, or amino containing up to about 12 carbon atoms.

EXAMPLE 1

40 grams of 3-dimethylamino-2,2,4,4-tetramethylcyclobutanone was dissolved in 250 ml. ether. 5 grams of water was added so that the ether was saturated with water during the reaction. This solution was exposed 6 hours in a quartz apparatus to a 600 watt mercury high pressure lamp (type Hanan Q 700). During this period 2600 ml. of carbon monoxide were evolved. Gas chromatographic analysis showed that 3% (moles) of the starting material was left unchanged and 45% (moles) of the starting material was converted to N,N,2,2,4,4-hexamethylcyclopropylamine and 40% (moles) of the starting material converted to 3-dimethylamino-5-hydroxy-2,2,4,4-tetramethyltetrahydrofuran and a small amount of dimeric product was formed. After the ether was evaporated, 10.2 grams (30% yield) of pure N,N,2,2,4,4-hexamethylcyclopropylamine was isolated by distillation at reduced pressure through a spinning band column (B.P. 34° C. at 18 mm. Hg). The residue was distilled at 0.1 mm. pressure. The main fraction (B.P. 69–70° C.) solidified. By recrystallization from ligroin 13 grams (30% yield) of 3-dimethylamino - 5 - hydroxy-2,2,4,4-tetramethyltetrahydrofurans was obtained.

Further examples of compounds which can be made by the treatment described in the foregoing Example 1 are:

EXAMPLE 2

3 - dibenzylamino-2,4-dibutyl-2,4-diethylcyclobutanone in the presence of water as in Example 1 yields N,N-dibenzyl-2,3-dibutyl - 2,3 - diethylcyclopropylamine and 3-dibenzylamine - 2,4 - dibutyl-2,4-diethyl-5-hydroxytetrahydrofuran.

EXAMPLE 3

3 - dimethylamino - 2,2,4,4 - tetramethylcyclobutanone dissolved in methanol but omitting the water yields N,N,2,2,3,3-hexamethylcyclopropylamine and 3-dimethylamine-5-methoxy-2,2,4,4-tetramethyltetrahydrofuran.

EXAMPLE 4

14-pyrrolidino-dispiro[5.1.5.1]tetradecan-7-one in the presence of t-butanol, and omitting the water yields 7-pyrrolidino-dispiro[5.1.5.0]tridecane and 7-t-butoxy-15-pyrrolidino-dispiro[5.2.5.1]-8-oxapentadecane.

EXAMPLE 5

3 - allylamino-3-phenyl - 2,2,4,4 - tetramethylcyclobutanone in the presence of t-butylamine and omitting the water, yields N - allyl-1-phenyl-2,2,3,3-tetramethylcyclopropylamine and 3 - allylamino-5-t-butylamino-3-phenyl-2,2,4,4-tetramethyltetrahydrofuran.

EXAMPLE 6

One gram of 3-pyrrolidino-2,2,4,4-tetramethylcyclobutanone was exposed in 25 ml. of methanol to a mercury high pressure lamp. About 35% of the starting material was converted to 1-pyrrolidino-2,2,3,3-tetramethylcyclopropane and about 65% to 2-methoxy-4-pyrrolidino-3,3,5,5-tetramethyltetrahydrofuran. Both products were isolated.

EXAMPLE 7

Twenty grams of 3-dimethylamino-2,2,4,4-tetramethylcyclobutanone and 50 grams of phenol were exposed in 220 ml. of dry ether to a 600-watt mercury medium pressure lamp and 1500 ml. of carbon monoxide (0.5 mole per mole of the aminocyclobutanone) was collected after a 5-hour irradiation. About 50% of the starting material was converted to N,N,2,2,3,3,-hexamethylcyclopropylamine and 40% to N,N,2,2,4,4-hexamethyl-5-phenoxytetrahydrofuran-3-amine. Both products were isolated.

EXAMPLE 8

Dimethylketene was passed into a solution of 2 grams of N,N-dimethyl(2-phenylpropenyl)amine in 20 ml. of ethyl acetate until all the enamine was consumed (checked by gas chromatography). This solution containing the adduct, 3 - dimethylamine-2-phenyl-2,4,4-trimethylcyclobutanone was then exposed for 30 hours to a mercury high pressure lamp. During this time 80 ml. of carbon monoxide evolved (40% of the theoretical amount for complete decarbonylation). A new product, present in about 30% yield relative to the amount of enamine consumed, was isolated and identified as N,N,2,2,3-pentamethyl-3-phenylpropylamine.

The substituted 3-aminocyclobutanones used as starting material in this invention can be prepared according to methods published by R. H. Hasek and J. C. Martin [J. Org. Chem. 26, 4775 (1961), and ibid. 28, 1468 (1963)], G. A. Berchteld, G. R. Harvey and G. E. Wilson [J. Org. Chem. 26, 4776 (1961)], G. Opitz, H. Adolf, M. Kleemann and F. Zimmermann [Angew. Chem. 73, 654 (1961)], G. Optiz, M. Kleemann and F. Zimmermann [Angew. Chem. 74, 32 (1962)] and G. Opitz and M. Kleemann [Ann. 665, 114 (1963)].

Although the invention has ben described in considerable detail with particular reference to certain preferred embodiments thereof, variations and modifications can be effected within the spirit and scope of the invention as described hereinbefore and as defined in the appended claims.

I claim:

1. The process which comprises subjecting a compound of the formula:

(I) 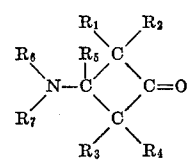

to irradiation with ultraviolet light having a wavelength of from about 250 to about 370 m$\mu$ in the presence of a compound of the formula R—H having a labile hydrogen atom and obtaining a compound having the formula:

(II) 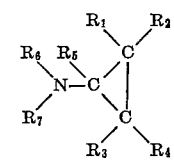

and a compound of the formula:

(III) 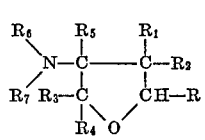

in which R is hydroxy, alkoxy, aryloxy, alkylamine or dialkylamino; each of $R_1$, $R_2$, $R_3$ and $R_4$, when taken singly, is:
  (a) alkyl of 1 to about 8 carbons, or
  (b) phenyl,
$R_1$ and $R_2$, taken collectively with the carbon atoms to which they are attached, and $R_3$ and $R_4$, when taken collectively with the carbon atoms to which they are attached, represent joined alkylene groups completing a saturated carbocyclic ring of 5 or 6 ring carbon atoms; $R_5$ is:
  (a) hydrogen,
  (b) alkyl of 1 to about 8 carbons, or
  (c) phenyl,
each of $R_6$ and $R_7$, when taken singly, is:
  (a) hydrogen,
  (b) alkyl of 1 to about 8 carbons,
  (c) allyl,
  (d) benzyl, or
  (e) phenyl,
and $R_6$ and $R_7$, when taken collectively with the nitrogen atom to which they are attached, represented joined alkylene groups completing a saturated heterocyclic ring of 5 to 6 ring atoms.

2. The process of claim 1 in which said compound R—H is water and the substitutent R is hydroxy.

3. The process of claim 1 in which said compound R—H is an alcohol of 1 to about 8 carbons and the substitutent R is alkoxy.

4. The process of claim 1 in which said compound R—H is an alkylamine of 1 to 8 carbons and the substitutent R is alkylamino.

5. The process of claim 1 in which said compound R—H is phenol and the substituent R is phenoxy.

6. The process of claim 1 in which the compound of Formula I is 3-dimethylamino-2,2,4,4,-tetramethylcyclobutanone.

7. The process of claim 1 in which the compound of Formula I is 3-dibenzylamino-2,4-dibutyl-2,4-diethylcyclobutanone.

8. The process of claim 1 in which the compound of Formula I is 14-pyrrolidino-dispiro[5.1.5.1]tetradecan-7-one.

9. The process of claim 1 in which the compound of Formula I is 3-allylamino-3-phenyl-2,2,4,4-tetramethylcyclobutanone.

10. The process of claim 1 in which the compound of Formula I is 3-pyrrolidino - 2,2,4,4 - tetramethylcyclobutanone.

References Cited
UNITED STATES PATENTS 3,169,972   2/1965   Parquette _____ 204—158 X HOWARD S. WILLIAMS, Primary Examiner U.S. Cl. X.R.

424—248, 267, 274, 278, 325